United States Patent
Rüb et al.

(10) Patent No.: US 7,540,932 B2
(45) Date of Patent: Jun. 2, 2009

(54) APPARATUS AND PROCESS FOR THE PRODUCTION OF SANDWICH COMPOSITE ELEMENTS

(75) Inventors: Thomas Rüb, Leverkusen (DE); Johannes Van De Braak, Much (DE)

(73) Assignee: Bayer MaterialScience AG, Leverkusen (DE)

( * ) Notice: Subject to any disclaimer, the term of this patent is extended or adjusted under 35 U.S.C. 154(b) by 614 days.

(21) Appl. No.: 11/120,453

(22) Filed: May 3, 2005

(65) Prior Publication Data

US 2005/0257893 A1    Nov. 24, 2005

(30) Foreign Application Priority Data

May 7, 2004  (DE) .................. 10 2004 022 677

(51) Int. Cl.
  *B32B 37/00*  (2006.01)
  *B32B 38/04*  (2006.01)
  *B32B 38/10*  (2006.01)
  *B29C 65/00*  (2006.01)
  *C08J 5/00*  (2006.01)
  *C09J 5/02*  (2006.01)
  *B05C 5/00*  (2006.01)
  *B05D 1/26*  (2006.01)

(52) U.S. Cl. .................. 156/250; 156/307.1; 156/307.3; 156/510; 156/524; 156/526; 118/300; 427/425

(58) Field of Classification Search ................. 156/71, 156/166, 250, 307.1, 307.3, 510, 523, 524, 156/526; 118/300; 427/425; 264/45.9, 46.2, 264/46.4, 46.5

See application file for complete search history.

(56) References Cited

U.S. PATENT DOCUMENTS

| | | | | |
|---|---|---|---|---|
| 3,649,408 A | | 3/1972 | Miller | ............. 156/272 |
| 4,019,938 A | * | 4/1977 | Forrester | ............. 156/78 |
| 4,521,462 A | * | 6/1985 | Smythe | ............. 427/156 |
| 6,130,268 A | * | 10/2000 | Murray | ............. 521/131 |
| 6,221,435 B1 | * | 4/2001 | Nielsen | ............. 427/421.1 |

FOREIGN PATENT DOCUMENTS

| | | | |
|---|---|---|---|
| DE | 1 609 668 | | 3/1972 |
| EP | 109224 A2 | * | 5/1984 |
| GB | 989639 | | 4/1965 |
| GB | 1160891 | | 8/1969 |
| JP | 53016783 A | * | 2/1978 |

OTHER PUBLICATIONS

English Abstract of JP 53-16783.*

* cited by examiner

*Primary Examiner*—Philip C Tucker
*Assistant Examiner*—Sing P Chan
(74) *Attorney, Agent, or Firm*—Lyndanne M. Whalen

(57) ABSTRACT

An apparatus for the production of sandwich composite elements which includes at least two feed apparatus for facings, to which an application apparatus for an adhesion promoter, an application apparatus for a core layer, a conveying apparatus and a cutting apparatus are connected one after the other. The application apparatus for the adhesion promoter includes at least one feed line for the adhesion promoter, a rotary table with at least one lateral outlet orifice and a drive for the rotary table.

6 Claims, 2 Drawing Sheets

APPARATUS AND PROCESS FOR THE PRODUCTION OF SANDWICH COMPOSITE ELEMENTS

BACKGROUND OF THE INVENTION

The present invention relates to an apparatus and to a process for continuous or discontinuous production of sandwich composite elements, in particular metal/foam composite elements.

For the purposes of the present invention, "sandwich composite element" means a composite element composed at least of two facings and a core layer located between the facings. In particular, metal/foam composite elements are made up of at least of two metal facings and a core layer of foam, e.g. a rigid polyurethane (PU) foam. Such metal/foam composite elements having metal facings and a core layer of rigid polyurethane foam are known from the prior art and are sometimes referred to as metal composite elements. Additional layers may be provided between the core layer and the facings. For example, the facings may be finished, e.g., with a coating.

Possible uses for such metal composite elements are, for instance, plane or lined wall elements and profiled roof elements for industrial hall and cold storage construction. The metal composite elements may also be used as truck bodies, hall doors and gates and in container construction.

Production of these metal composite elements using a continuous or discontinuous process is known from the prior art. Apparatus for continuous production are disclosed, for example, in DE 1 609 668 A and DE 1 247 612 A.

In addition, it is known in the production of metal composite elements that application of a chemical component such as an adhesion promoter, bonding agent, resin or the like to the facings before the core layer is foamed in place improves adhesion of the foam to the metal facings. For example, the use of polymerization adhesives is described in DE 1 176 834 A. For the purposes of the present invention, such chemical components used to improve the adhesion of the core layer to the facings, are designated simply as adhesion promoters.

In addition to inadequate adhesion of the core layer to the facings, another problem encountered with metal/foam composites is encountered in the boundary areas of the foam core layer near the facings where defects arise in the foam, in general in the form of bubbles or altered cell structures. These defects in the foam may restrict the usability of the metal composite elements and are therefore undesirable. However, they may be reduced or wholly prevented by applying an adhesion promoter to the facings.

Conventionally, such adhesion promoters are applied to the facings by spraying or sprinkling by means of nozzles, drip strips, rakes or the like or spreading by means of large or small brushes, rollers or the like.

The known methods for applying the adhesion promoter are sometimes comparatively complex and/or result in uneven application of the adhesion promoter. In addition, considerable aerosol formation is associated with spray application of the adhesion promoter, leading to the loss of certain quantities of the adhesion promoter, since not all of the sprayed adhesion promoter lands on the facings but is released into the surrounding area instead. Additionally, emission of the spray mist into the surrounding area has to be prevented by complex extraction apparatuses. Depending on the type of adhesion promoter, blockage of the extraction apparatus may occur.

SUMMARY OF THE INVENTION

It is an object of the present invention to provide an apparatus and a process for the production of sandwich composite elements, in particular metal/foam composite elements, with which the disadvantages of the prior art are avoided when applying an adhesion promoter.

This and other objects of the present invention which will be apparent to those skilled in the art are accomplished by using the apparatus described herein.

DETAILED DESCRIPTION OF THE PRESENT INVENTION

Figure 1:
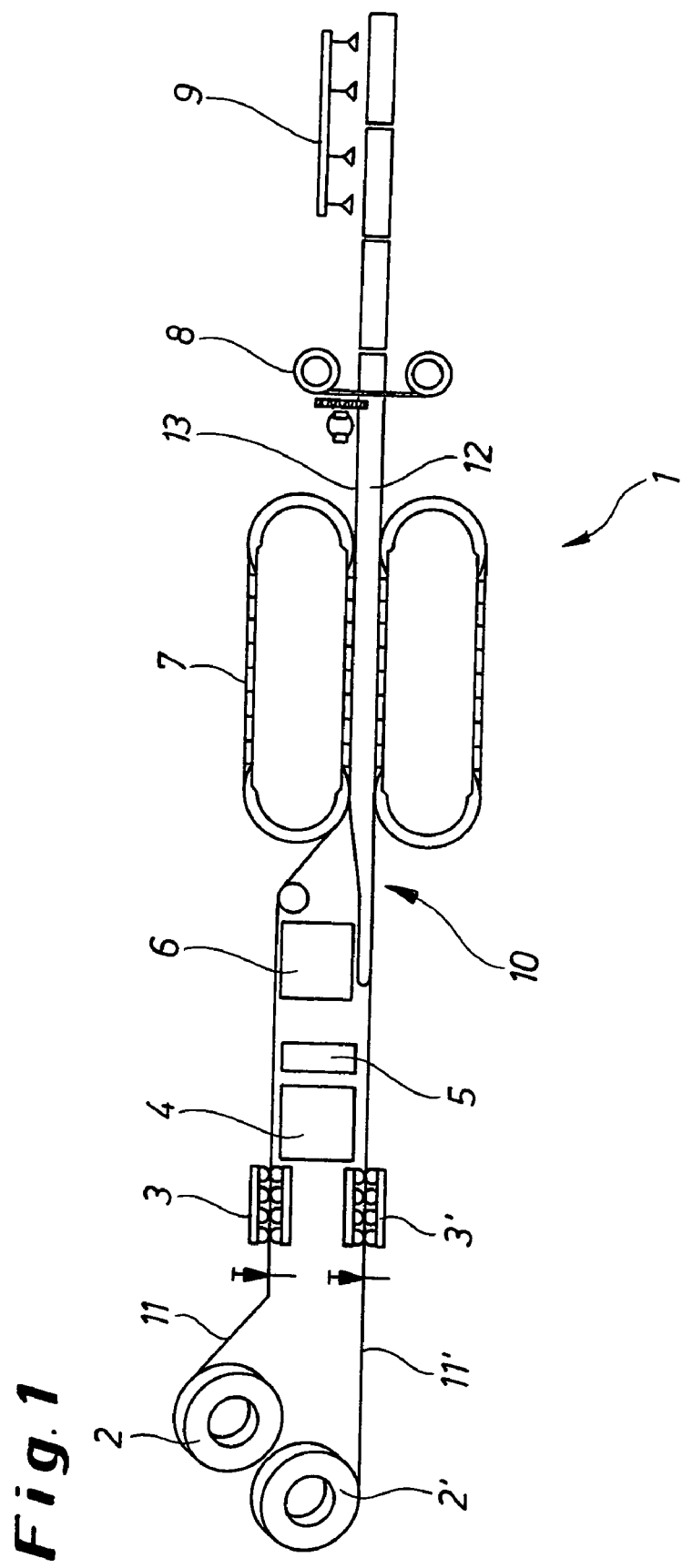
FIG. 1 is a schematic representation of an embodiment of the apparatus according to the invention for the production of sandwich composite elements.

The present invention provides an apparatus for the production of sandwich composite elements which includes (a) at least two feed apparatus for facings to which (b) an application apparatus for an adhesion promoter, (c) an application apparatus for a core layer, (d) a conveying apparatus and (e) a cutting apparatus are connected one after the other. Included in the application apparatus for the adhesion promoter (b) are a feed line for the adhesion promoter, a rotary table with at least one lateral outlet orifice and a drive for the rotary table.

The apparatus of the present invention comprises two feed apparatus for two facings, i.e., one feed apparatus for each facing. In the case of, for example, a relatively thin metallic facing, the feed apparatus may be an uncoiling apparatus, e.g., reel or roll. If the material for a facing is not suitable for coiling, the facing may also be supplied in the form of sheets. Suitable apparatus for loading an installation with sheets are known in the prior art.

The feed apparatus are optionally followed by a profiling apparatus for shaping the facings. The profiling apparatus may take the form of roller runs, for example. However, shaping may also be performed by means of presses.

The profiling apparatus is optionally followed by a heating apparatus for heating the facings. Gas flames, hot air, radiant heaters or heating tubes may be used for heating, for example.

Downstream of the heating apparatus, an adhesion promoter is applied by means of an application apparatus.

This is followed by application of a core layer, in particular a foam-forming reaction mixture for the production of a rigid foam, by means of an application apparatus. Application apparatus suitable for this purpose are known. If, as in the case of a core layer of rigid foam, a liquid foam reaction mixture is applied to a facing for foaming in situ, the application apparatus comprises a mixing member for producing the foam reaction mixture and an application member for the reaction mixture. Mixing of the foam-forming components may be performed in an agitated mixer or by means of high pressure mixing (for example, using the counterflow method) with at least two components being mixed in the mixing head. After leaving the mixing head, the reaction mixture arrives at the application member, which may, for example, comprise a casting rake or a nozzle, in particular a tongue nozzle. For uniform application onto the lower facing, the application apparatus, e.g. the mixing head with application member, is guided as a rule oscillatingly over the width of the metal facing.

As an alternative to application of a foam-forming reaction mixture to a facing to obtain the core layer, a prefabricated sheet may also be applied as a core layer between the facings. Prefabricated sheets may, for example, be composed of mineral fibers or rigid foam, e.g., rigid PU or PI foam, polystyrene foam, or phenolic foam. In this case, the core layer is connected to the facings by adhesive bonding. The application apparatus for the core layer comprises for this purpose at least one application member for an adhesive and an apparatus for loading the installation with a sheet-form core layer. Suitable apparatus for applying adhesives and loading sheets are known to the person skilled in the art.

In the case of a core layer comprising a foam produced from a foam-forming mixture, the application apparatus for the core layer is followed as a rule first of all by a foaming section. Foaming from the liquid state begins after a brief cream time in the foaming section, wherein the foam gradually fills the space between the two facings, i.e. as it passes along the section.

The foaming section is followed in turn by a conveying apparatus, in particular in the form of a double conveyor. The conveying apparatus gives the composite element its height and width dimensions. The double conveyor is made up of two conveyor belts composed of steel sheets and arranged above the upper and below the lower facing. The steel sheets of the double conveyor, which generally travel with the composite element without slippage, limit upward and downward expansion of the foam. The expanding foam is restricted on both sides for example by co-travelling block chains. The top belt of the double conveyor is height-adjustable, so as to be able to produce composite elements of different thicknesses. The conveying apparatus may be heated, in order to assist in the foaming process.

A conveying apparatus operating according to the double conveyor principle is described in DE 1 609 668 A, for example.

The continuously produced metal/foam composite elements are cut to a desired size downstream of the conveying apparatus in a cutting apparatus. Examples of suitable cutting apparatus are: bandsaws, wide-bladed or circular saws, a bandsaw in conjunction with a circular saw and guillotine shears.

In accordance with the present invention, the apparatus for applying the adhesion promoter comprises at least a feed line, a rotary table with at least one lateral outlet orifice for discharge of the product and a drive for the rotary table. The rotary table may be driven pneumatically, electrically or hydraulically. According to the invention, the adhesion promoter is applied to the lower plane or profiled facing. By rotating the rotary table, the adhesion promoter, which is discharged from the lateral outlet orifice(s), is applied uniformly to the lower facing in minuscule droplets as a disintegrating jet.

The application apparatus is positioned in the apparatus for producing the composite elements in such a way that the adhesion promoter is applied to the optionally heated lower facing at a suitable point between the heating apparatus (also designated heating section) and application of the core layer, in particular of the foam-forming reaction mixture.

The adhesion promoter is fed to the rotary table via at least one feed line. A metering apparatus, e.g. a pump, is preferably provided. If the adhesion promoter comprises only one component, the rotary table may be connected to a storage tank for the adhesion promoter via one or more feed lines with or without metering apparatus. This also applies if the adhesion promoter is composed of a plurality of components which may be stored as a mixture and supplied from one storage tank to the rotary table. In contrast, if the adhesion promoter is composed of a plurality of components which are mixed together only immediately or in as short a time as possible before application to the facing, a mixing member is provided for mixing the components to produce the adhesion promoter. The mixing member is connected to the rotary table of the application apparatus via one or more feed lines with or without metering apparatus. As an alternative to a metering apparatus, feed of the adhesion promoter may also proceed under pressure.

The mixing member may take the form of a separate apparatus connected to the rotary table via the feed line. Examples of mixing members are: agitated mixers, high pressure counterflow injection mixers, and static mixing elements.

Depending on the type of components to be mixed to produce the adhesion promoter, in particular in the case of readily miscible adhesion promoter formulations, homogenization of the components may also proceed without an upstream mixing member solely as a result of the flow movements in the rotary table as it rotates in operation. For this purpose, the components may also be fed to the rotary table independently of one another by separate feed lines with or without metering apparatus. A hose, tube or the like may serve as feed line, a hose or tubing being preferred.

As an alternative to flushing with air, an extended control plunger in the self-cleaning mixing head of the mixing member may serve as a mechanical cleaning system for the product feed line on completion of the shot.

The rotary table is provided with one or more outlet orifices for the adhesion promoter. The lateral outlet orifices distributed, preferably equidistantly, over the circumference of the rotary table and from which the adhesion promoter is discharged are preferably round, but may be any shape, e.g., square or slot-shaped. The rotary table takes the form, for example, of a shallow hollow cylinder, wherein the outlet orifices are located in the side wall of the cylindrical rotary table, preferably at the lower edge of the side wall adjoining the base of the rotary table. In principle, any desired number of outlet orifices may be provided. In the case of a very high number of outlet orifices arranged relatively close together, the adhesion promoter is discharged virtually over the entire circumference of the rotary table. Finally, an embodiment is also feasible in which no individual outlet orifices are provided, the adhesion promoter instead flowing out from the rotary table uniformly over the entire circumference thereof. In this embodiment, the rotary table takes the form of a disk.

A rotary table in the form of a shallow hollow cylinder may be open at the top. In this embodiment, the rotary table resembles a shallow, round dish, into which the adhesion promoter feed line leads. Alternatively, however, the rotary table may also be closed at the top. The rotary table then comprises, in addition to the outlet orifices, an additional opening for each feed line, so as to supply the adhesion promoter to the rotary table.

Apart from a shallow, cylindrical rotary table shape, further, especially rotationally symmetrical shapes are possible. The rotary table may, for example, taper towards the top, thus assuming the shape of a truncated cone.

The number of outlet orifices, the circumferential speed and centrifugal acceleration at the outlet orifices of the rotary table, the mass flow rate of the adhesion promoter and the height of the outlet orifices relative to the lower metal facing may influence the distribution per unit area. In addition, the surface coverage may be varied. The adhesion promoter may be applied over the entire surface or part thereof. The application apparatus according to the invention for the adhesion promoter in particular allows partial surface coverage, which is enough to ensure sufficient adhesion of the core layer to the facing. If the conveying apparatus in the form of a double conveyor travels at a preferred belt speed of 2 to 20 m/min and the adhesion promoter is discharged in a preferred amount of 200 to 1600 g/min, the diameter of the rotary table is preferably 50 to 100 mm. 6 to 12 outlet orifices with a diameter of from 0.5 to 2 mm are preferably provided. The rotary table preferably rotates at a rotational speed of 2500 to 8000 revolutions per minute.

The application apparatus according to the invention has an advantage over spray application in that no aerosol is formed. Thus, no adhesion promoter is lost due to spray mist formation. All in all, less adhesion promoter is required with the apparatus according to the invention. Furthermore, with the application apparatus according to the invention, sufficiently good distribution over the lower facing is achieved even without oscillation of the application apparatus over the width of the facing. This has the advantage that no movable components have to be provided for the adhesion promoter application apparatus.

The adhesion promoter may comprise single-component systems, for example based on polyurethane, such as prepolymers containing NCO groups. Other possible single-component systems are based on polychloroprene, epoxide and/or polyvinyl acetate.

The adhesion promoter may also comprise a multi-component system, preferably a two-component system. Preferred two-component systems are PU systems. Particularly preferred PU systems include a polyol component based, e.g., on polyether or polyester, and an isocyanate component based, e.g., on monomeric or polymeric MDI. Instead of a polymeric MDI, mixtures of different monomeric MDIs may be used.

Materials for the facings are conventionally metals such as steel (e.g., galvanized, coated), aluminum (e.g., coated, anodized), copper or stainless steel or non-metals such as reinforced (e.g., with glass fibers), unreinforced and/or filled plastics (e.g., polyvinyl chloride or polyester-based plastics), impregnated cardboard, paper or wood. Combinations of the above-mentioned materials are also suitable.

The following materials may be used as the core layer: fiber board of mineral fibers or sheets of rigid foam, e.g., rigid PU or PI (polyisocyanurate) foam, polystyrene foam, or phenolic foam.

For in situ foaming of the core layer, rigid foams are preferably selected, most preferably those based on polyurethane and/or polyisocyanurate. To produce rigid foams comprising urethane and/or isocyanurate groups, the following may be used as starting components: a) aliphatic, cycloaliphatic, araliphatic, aromatic and heterocyclic polyisocyanates, preferably diphenylmethane diisocyanate (MDI) or polyphenyl polymethylene polyisocyanates, polyisocyanates which include carbodiimide groups, urethane groups, allophanate groups, isocyanurate groups, urea groups or biuret groups, most preferably based on polyphenyl polymethylene polyisocyanate, and b) compounds with at least two isocyanate-reactive hydrogen atoms with a molecular weight in the range from 400 to 10,000, e.g., compounds comprising amino groups, thiol groups, hydroxyl groups or carboxyl groups.

The production of foams proceeds using auxiliary substances and additives such as catalysts, blowing agents, crosslinking agents, flame retardants, foam stabilizers, flow promoters and inhibitors.

The invention further provides a process for the production of sandwich composite elements using the apparatus according to the invention.

The invention is explained in greater detail below with reference to the attached drawings.

FIG. 1 is a schematic representation of one embodiment of the present invention. Apparatus 1 is particularly suitable for the production of sandwich composite elements, in particular, metal/foam composite elements. Apparatus 1 comprises two uncoiling apparatuses 2, 2' for the upper and lower facings 11, 11'. When apparatus 1 is in operation in accordance with the present invention, the facings 11, 11' first pass through a profiling apparatus 3, 3' and then a heating apparatus 4, before they pass through an application apparatus 5 for the adhesion promoter. By means of the application apparatus 5, the adhesion promoter is applied to the lower facing 11. Downstream of the application apparatus 5 for the adhesion promoter there is connected an application apparatus 6 for the core layer, in particular the foam-forming reaction mixture. This introduces the core layer, in particular the reaction mixture for the rigid foam, between the facings 11, 11'. The application apparatus 6 comprises a mixing member (not shown) for the production of the foam reaction mixture. This may be an agitated mixer, for example, or a high pressure mixer, e.g. of the counterflow type. The application member itself (not shown) may comprise a casting rake or a tongue nozzle, for example. For uniform application on the application table, the mixing head is guided with the application member as a rule oscillatingly over the width of the metal facing 11'.

In the embodiment shown in FIG. 1, a foaming section 10 follows the core layer application apparatus 6. Foaming from the liquid state begins after a brief cream time in the foaming section 10, wherein the foam 12 fills the space between the two facings 11, 11'.

The foaming section 10 is in turn followed by a conveying apparatus 7 in the form of a double conveyor above and below the upper and lower facings 11, 11'. The conveying apparatus 7 gives the composite element 13 its height, while the side chains, side belts, block chains or the like (not shown) impart the width. The double conveyor 7 is composed of steel sheets, which are arranged above the upper and below the lower facings 11, 11'. The steel sheets of the double conveyor 7 travelling with the composite element 13 limit upward and downward expansion of the foam 12.

The endlessly produced metal/foam composite elements 13 are cut to a desired size downstream of the conveying apparatus 7 in a cutting apparatus 8. Finally, stacking 9 of the individual composite elements 13 takes place.

Figure 2:
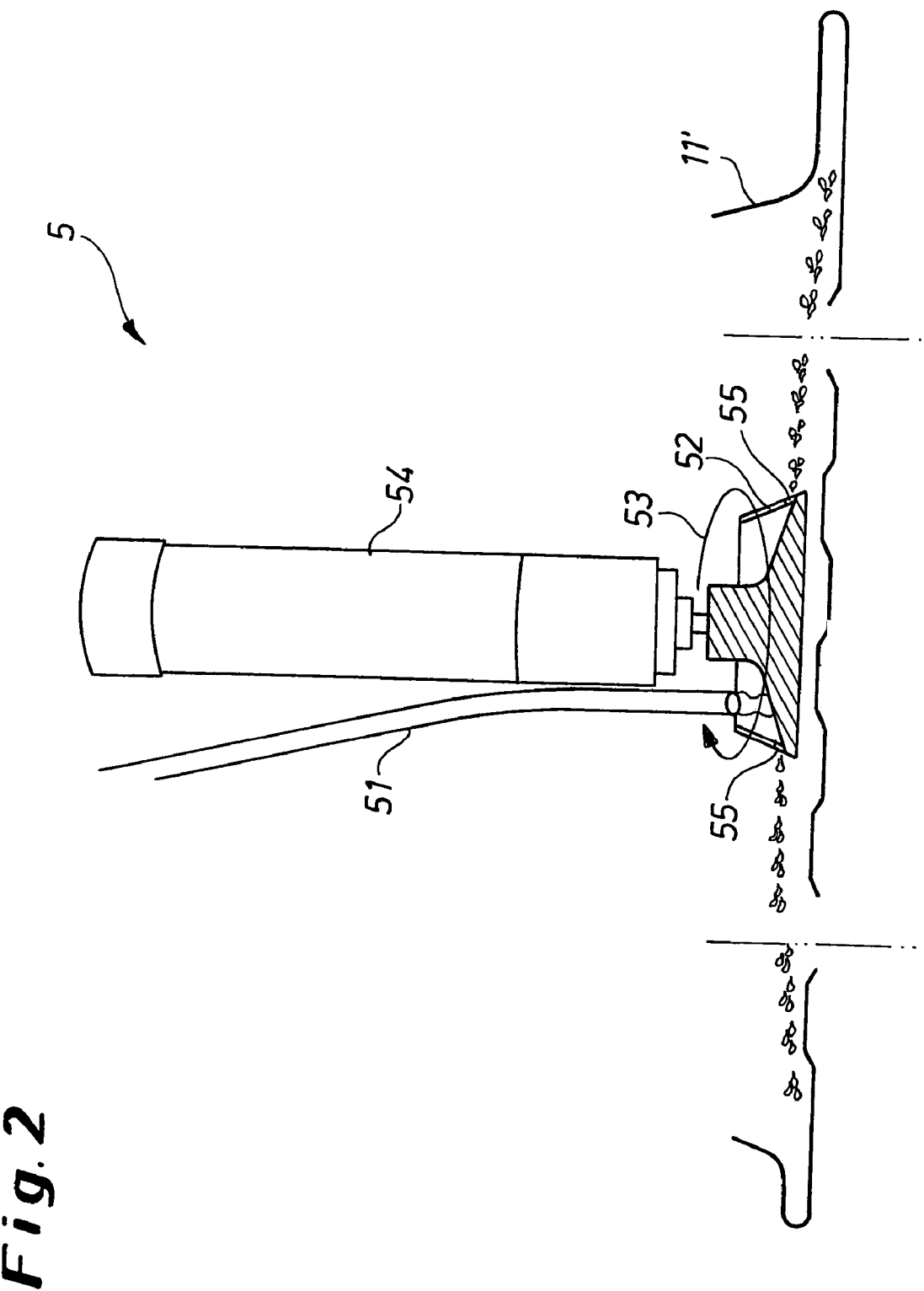
FIG. 2 shows a schematic cross section of an embodiment of the application apparatus for the adhesion promoter illustrated in FIG. 1.

FIG. 2 is a cross-sectional representation of the application apparatus 5 for the adhesion promoter. The application apparatus 5 comprises a rotary table 52 with lateral outlet orifices 55 (two such outlet orifices are shown in FIG. 2). The rotary table 52 is driven by means of a pneumatic drive 54. The rotary motion of the rotary table 52 is indicated by the arrow 53. The adhesion promoter is fed to the rotary table 52 via the feed line 51. In the embodiment shown, the rotary table 52 tapers conically. In principle, the rotary table 52 may also assume the form of a shallow cylinder or a thick disk. The rotary table 52 is positioned just above the lower facing 11'. The facing 11' illustrated is profiled.

Having thus described the invention, the following Example is given as being illustrative thereof.

EXAMPLE

Metal/foam composite elements with conventional commercial facings of galvanized steel sheet, coated on both sides, and rigid foam prepared according to the processing recipe stated below using products from Bayer MaterialScience AG, Germany, were produced by means of an apparatus corresponding in structure to that illustrated in FIG. 1.

Processing recipe and conditions for the foam:

| Product | Parts by weight |
|---|---|
| Baymer VP.PU 28HB31 Polyol | 100 |
| Desmorapid ® 1792 catalyst | 3.7 |
| Desmorapid VP.PU 27HB33 catalyst | 2.2 |
| Additive VP.PU 19IF00 | 2.8 |
| n-Pentane | 15.5 |
| Desmodur ® 44V70 L isocyanate | 200 |
| Cream time, sec | 9 |
| Fiber time, sec | 38 |
| Element type | Wall, 120 mm |
| Belt temperature, ° C. | 60 |

A two-component polyurethane-based adhesion promoter was used as the adhesion promoter. The isocyanate component was composed of a low viscosity polymeric MDI, Desmodur 44V10 L. A formulation of the following components was used as the polyol component:

| | |
|---|---|
| 59.6 wt. % | propylene glycol-propylene oxide polyether, molar mass 1000 g/mol |
| 40.0 wt. % | o-toluenediamine-ethylene oxide-propylene oxide polyether, molar mass 540 g/mol. |
| 0.2 wt. % | 1-methylimidazole |
| 0.2 wt. % | Tegostab B 8443, Goldschmidt |

The polyol and isocyanate components were processed in a ratio by weight of 1:1. The quantity applied on the lower facing was 100 g/m$^2$.

Unless otherwise stated, all the products are made by Bayer MaterialScience AG, Germany.

The adhesion promoter was applied to the lower facing using a rotary table corresponding to that illustrated in FIG. 2. The adhesion promoter was applied at a rate of 944 g/min at a conveyor speed of 8 m/min and a rotary table rotational speed of 4800 rpm. The rotary table had a diameter of 50 mm and had 6 outlet orifices, each with a diameter of 1.2 mm. The rotary table was so positioned that the outlet orifices were arranged at a distance of 5 mm above the lower facing. The width of the lower facing was 1180 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of sandwich composite elements with an apparatus comprising:
    a) at least two feed apparatuses for facings to which
    b) an application apparatus for an adhesion promoter,
    c) an application apparatus for a core layer,
    d) a conveying apparatus and
    e) a cutting apparatus
    are connected one after the other, in which the application apparatus for adhesion promoter comprises:
        1) at least one feed line for the adhesion promoter,
        2) a rotary table with
            (i) at least one lateral outlet orifice and
            (ii) a drive,
    said process comprising:
        A) applying an adhesion promoter to a lower facing,
        B) introducing a core material between the facings,
        C) conveying the composite to a collection point.

2. The process of claim 1 in which the adhesion promoter is applied using a rotary table rotating at a speed of from 2500 to 8000 rpm.

3. The process of claim 2 in which the conveying apparatus moves the composite element at a speed of from 2 to 20 m/min.

4. The process of claim 1 in which the conveying apparatus moves the composite element at a speed of from 2 to 20 m/min.

5. The process of claim 1 in which the adhesion promoter is discharged in an amount of from 200 to 1600 g/min.

6. The process of claim 1 in which a two-component polyurethane-based adhesion promoter is used.

* * * * *